(12) United States Patent
Browne et al.

(10) Patent No.: US 7,155,665 B1
(45) Date of Patent: Dec. 26, 2006

(54) METHOD FOR CREATING AN EMBEDDED DATABASE IN A SPREADSHEET

(75) Inventors: Kevin F. Browne, Issaquah, WA (US);
Erik V. Schwiebert, Seattle, WA (US);
Michael C. Connolly, Seattle, WA (US);
Geoffrey M. Price, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 09/883,805

(22) Filed: Jun. 18, 2001

(51) Int. Cl.
*G06F 17/24* (2006.01)

(52) U.S. Cl. ...................... 715/503; 715/504

(58) Field of Classification Search ............... 715/503, 715/504
See application file for complete search history.

(56) References Cited

U.S. PATENT DOCUMENTS

| | | | | |
|---|---|---|---|---|
| 5,396,621 A | * | 3/1995 | MacGregor et al. | 345/809 |
| 5,604,854 A | * | 2/1997 | Glassey | 715/503 |
| 5,706,449 A | * | 1/1998 | Liu et al. | 345/823 |
| 6,154,740 A | * | 11/2000 | Shah | 707/7 |
| 6,205,453 B1 | * | 3/2001 | Tucker et al. | 715/503 |
| 6,216,139 B1 | * | 4/2001 | Listou | 715/505 |
| 6,373,504 B1 | * | 4/2002 | Nielsen | 345/739 |
| 6,631,497 B1 | * | 10/2003 | Jamshidi et al. | 715/514 |

OTHER PUBLICATIONS

Excel 2000, Microsoft, released 1999, screenshots pp. 1-16.*
Excel 2000, Microsoft, released 1999, additional screenshots, pp. 1-5.*
Excel 2000, Microsoft, released 1999, screenshots, pp. 1-16.*

* cited by examiner

*Primary Examiner*—Heather R. Herndon
*Assistant Examiner*—Michael K. Botts
(74) *Attorney, Agent, or Firm*—Ronald M. Anderson

(57) ABSTRACT

Generally described, the invention is a graphical method for creating an embedded database, or List Object, within a spreadsheet program, wherein the List Object is made up of a number of individual records, which in turn are made up of a number of data fields. The method is a multi-step process that uses a graphical interface to create the List Object, also known as a List. In the first step of the process, the user must define where the data for the List is coming from and where the List will be stored in the spreadsheet program. Specifically, the user must identify whether any pre-existing data will be used to populate the List or whether the List will be populated from scratch. Next, the user must define the data fields in the list, which includes naming each field and defining the data type for each field. Finally, in the last step of the process, the List is created in the spreadsheet program in such a manner that each field in each record is logically associated to every other field in the record.

14 Claims, 13 Drawing Sheets

METHOD FOR CREATING AN EMBEDDED DATABASE IN A SPREADSHEET

TECHNICAL FIELD

The invention generally relates to creating a database, and more specifically relates to creating a database embedded within a spreadsheet program.

BACKGROUND

The term database applies to any system in which information is categorized, stored, and used. A database is a collection of related information that is grouped as a single item. A simple example of a database is a card file, which contains the name, address, and phone number of multiple individuals. The physical card file is not the database. Rather, the database is the contents of the card file the specific manner in which the contents are organized. The physical card file is only a tool for organizing the information. In this regard, computer databases, such as MICROSOFT ACCESS and DBASE are tools for storing and organizing large quantities of information.

Information in a database is typically organized in and stored in a table of rows and columns. Rows in a database file are known as "records," and columns are known as "fields." Referring back to the example of a card file, each card in the card file is a single record, and each category of information on the card is a field. Fields can contain any type of information that can be categorizes. In the example, each "card" may contain three fields: name, address, and phone number of an individual. Because each card contains the same type of information, the collection of individual cards makes a database.

Because databases are stored and organized as a table of rows and columns, computer spreadsheet programs are a logical choice for storing databases. However, spreadsheet programs are limited to the number of cells that can contain data, which makes spreadsheet programs impractical for storing large databases. On the other hand, the fact that spreadsheet programs manipulate and store data in a tabular format makes spreadsheet programs suitable for managing small databases. In fact, most users of spreadsheet programs often use a spreadsheet to manage simple databases, such as contact lists and phone lists.

However, spreadsheet programs do not link the data in individual cells together in any way other than the fact that the individual data elements are located next to each other. For instance, two adjacent cells in a row would not be considered to be related or logically linked together, and may easily become separated. This inability of spreadsheet programs to logically associate adjacent cells with one another leads to several drawbacks for using a spreadsheet program for managing databases. For instance, a user cannot insert any blank records in the database because the spreadsheet program would interpret the blank record as the end of the database. Any records occurring after the blank record would be ignored.

However, the biggest problem encountered using the spreadsheet program as a database manager occurs when the user assumes that a tabular structure exists and therefore the data will behave in a certain way. Unfortunately, the data behaves in a manner opposite of what the user expected. For example, spreadsheet users have been known to get less than desirable results from a sort operation because sorting involves rearranging large amounts of data. Because the individual cells in a record were not logically linked together or associated with one another, when a user attempted to sort the data there is the possibility that the user will make a selection that causes the spreadsheet program to sort the data in a way that the user did not expect. To illustrate, if a user selected only a portion of the data before they invoked the Sort command, the Sort command would cause only the selected data to be sorted. The remaining data would be unaffected. In many instances would give the user a result different that what the user expected. As an illustration, suppose the user wanted to sort a phone list, which included columns labeled "NAME," "ADDRESS," and "PHONE NUMBER" using the "NAME" column. Intuitively, the user would likely select the "NAME" columns and invoke the Sort command and expect that the phone list would be sorted alphabetically by name. However, if the user selected only the column labeled "NAME" and invoked the Sort command from within the spreadsheet program, only the column labeled "NAME" would be sorted. The remaining columns, namely "ADDRESS" and "PHONE NUMBER" would be unchanged. The result of this simple sorting action would be to completely jumble the data and put unrelated cells next to one another.

One solution to the problem of sorting data was to have the user define the database every time they wished to rearrange the data. In previous versions of the MICROSOFT EXCEL spreadsheet program for the Macintosh computer, "intelligence" was added to the spreadsheet program in an attempt to overcome this problem. For example, when the user invoked the Sort command, the MICROSOFT EXCEL spreadsheet program would "intelligently" identify associated columns of data and automatically select them. However, if the any of the columns included a blank record, or row, the "intelligent" selection would select only those contiguous records between the field names in the top-most row and the blank record. If any data was present below the blank record, it was be excluded by the "intelligent" selection. Therefore, when the Sort command was invoked, only data above the blank record would be sorted. Unfortunately, this garbled data and resulted in user frustration.

Another "intelligent" solution incorporated into previous versions of the MICROSOFT EXCEL spreadsheet program for the Macintosh was the propagation of the table format to newly added rows and columns to an existing table. Under this solution, every time a record was added, the record was given the same format as the record above it. Unfortunately, both of these solutions suffered from a common flaw: adding intelligent solutions cannot account for every possible data layout. If one were to try to invent an "intelligent" solution for every problem, the program would be too cumbersome to operate effectively. Furthermore, one solution that works for one user may not work for another user. Thus, the amount of guesswork to build in acceptable "intelligent" solutions must be kept to a minimum, or the program runs the risk of doing too much unwanted work for the user.

Thus, there is a general need in the art for a more efficient method of creating an embedded database, or List Object, in a spreadsheet application so that the contents of the List Object act as the user expects when the user manipulates the data. There is a still a further need in the art for a method of allowing a user to graphically create a List Object within a spreadsheet program.

SUMMARY OF THE INVENTION

Generally described, the invention meets the above-described needs by providing a graphical method for creating a List Object within a spreadsheet program, wherein the List Object is made up of a number of individual records, which in turn are made up of a number of data fields. The method is a multi-step process that uses a graphical interface to create the List Object, also known as a List. The List may be either a List Sheet, in which the entire spreadsheet is treated as a List Object, or a List Object, in which only a portion, or a limited range of cells is treated as a List Object. In the first step of the process, the user defines where the data for the List is coming from and where the List will be stored in the spreadsheet program. Specifically, the user must identify whether any pre-existing data will be used to populate the List or whether the List will be populated from scratch. Next, the user must define the data fields in the list, which includes naming each field and defining the data type for each field. Finally, in the last step of the process, the List is created in the spreadsheet program in such a manner that each field in each record is logically associated to every other field in the record.

More specifically, the invention also describes a method for determining whether any pre-existing data is used to populate the List. First, the determination is made whether the pre-existing data is located in a spreadsheet program worksheet. If the pre-existing data is located in a spreadsheet program worksheet, the user identifies the range within the worksheet that contains the pre-existing data. However, if the pre-existing data is not located in the spreadsheet program worksheet, the process opens a Query dialog box and the user may navigate to the remote location that contains the pre-existing data.

The invention also describes a user interface for graphically creating a List Object within a spreadsheet program. The user interface contains three dialog boxes. The first dialog box is used to identify the location of the data to import into the List Object and the location where the List Object will be placed in the spreadsheet. The second dialog box is used to define the fields within the List Object. The second dialog box contains a window for defining the fields in the List Object, a field name box for receiving a field name for each field defined in the window, and a drop down menu for selecting a data type to associate with each field defined in the List Object. The third dialog box is used to save the List Object and all of the associated data types in a format, such that each field within each record of the List Object is logically associated to every other field in the record.

That the invention improves over the drawbacks of methods for creating List Objects, or Lists, in spreadsheet programs and accomplishes the advantages described above will become apparent from the following detailed description of the exemplary embodiments and the appended drawings and claims.

DETAILED DESCRIPTION OF EMBODIMENTS OF THE INVENTION

Figure 1:
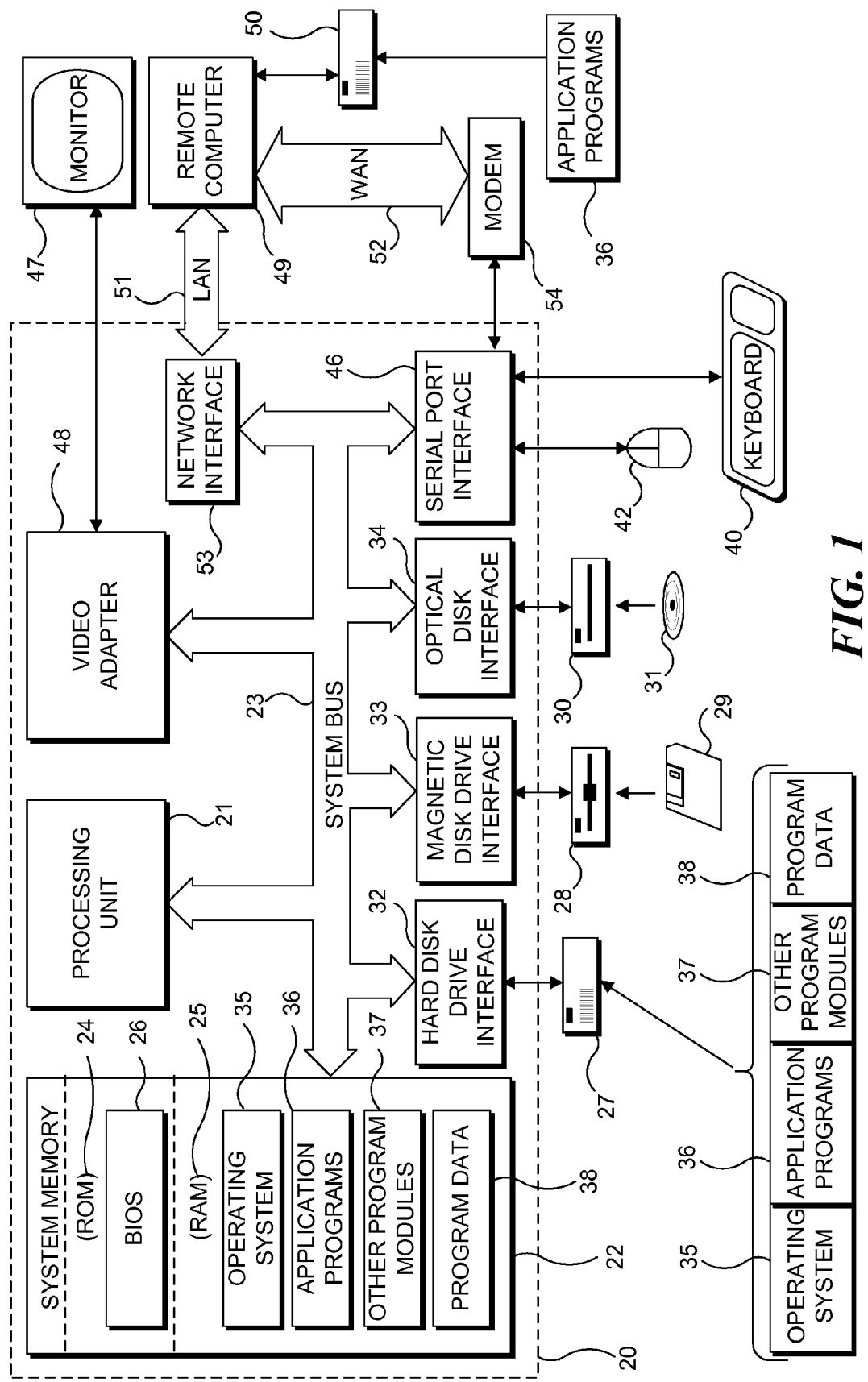
FIG. 1 is block diagram of a personal computer that provides the operating environment for an embodiment of the invention.

The present invention is directed toward a graphical method for creating an embedded database, also known as a List Object in a spreadsheet program. In one embodiment, the invention is incorporated into the MICROSOFT EXCEL for MAC spreadsheet program of the "MICROSOFT OFFICE 2001 for Mac" suite of application programs marketed by Microsoft Corporation of Redmond, Wash. Briefly described, the method displays three separate dialog boxes within the MICROSOFT EXCEL for MAC spreadsheet program that allow the user to graphically create an embedded database, also known as a List Object, within a worksheet. There are two variants of List Objects within the spreadsheet program: a normal List Object and a List Sheet. A normal List Object is best described as a database table integrated into the MICROSOFT EXCEL for MAC worksheet. The normal List Object occupies only a portion of the MICROSOFT EXCEL for MAC worksheet so other MICROSOFT EXCEL for MAC spreadsheet data can reside simultaneously on the worksheet with the List Object. Normal List Objects allow the user the flexibility to refer to List Object data in other cells or fill List Object cells by referring to other cells outside the List Object.

List Sheets on the other hand, turn the entire MICROSOFT EXCEL for MAC worksheet into a database, or datasheet. The List Sheet transforms the entire usable range of cells on the worksheet into a single List Object, and to hide any cells outside the used range. The intent of hiding other cells is to eliminate user confusion.

The advantage of using List Objects, either normal List Objects or List Sheets, to manage data is that List Objects simplify the task of managing associated data by treating the entire range of associated data as a single unit. In previous version of the MICROSOFT EXCEL spreadsheet program for the Macintosh operating system, the user had to explicitly manage each cell and its contents individually when performing simple database operations. Treating the collection of individual cells as a single unit maintains the association between cells or fields whenever the user performs a database operation on the List Object, which gives the user the results that he or she expected.

The present invention allows a user to create a List Object from scratch on a new worksheet or convert existing data on a worksheet in the MICROSOFT EXCEL for MAC spreadsheet program into a List Object. The main entry point to create a List Object is through the "List . . . " command on the "Insert" drop-down menu from the Toolbar. Alternatively, the user can create a List Object by selecting the "List . . . " option from the Project Gallery startup dialog box. The Project Gallery startup dialog box appears whenever the MICROSOFT EXCEL for MAC spreadsheet program is launched or the user selects to open a new worksheet from the "File" drop-down menu of the Toolbar.

When the "List . . . " command is invoked, a three-step "List Wizard" is presented to the user. The first step allows the user to set simple rules that define the structure of the List Object. The second step allows the user to select any initial data that is to be included in the List Object. The final step allows the user to turn on any advanced options that the user wants to apply to the List Object. Typically, the List Wizard will be displayed at every entry point for creating a List Object. The List Wizard consists of three separate dialog boxes that correspond to the three separate steps in creating a List Object.

The first dialog box allows the user to specify where the data to populate the database is coming from, and where the List Object will be physically located within the worksheet. If the data need to populate the database is located at a remote location, a Query dialog box is opened, and the user may graphically navigate to the site where the data is located. The user may also specify whether the List Object occupies the entire worksheet or merely a portion of the worksheet.

The second dialog box allows the user to define the fields in the database. For instance, the user may add, delete, or modify any field within the List Object. The user may also define the data type of each field. Additionally, the user may define the format characteristics associated with each data type, such as date display format, currency type, and the like. Lastly, the third dialog box allows the user to save the List Object and the associated format characteristics associated with each field as a separate database.

Once the List Object is created, the cells within each row of the List Object are linked together to form a single record. Similarly, each cell within each column is linked to every other cell in the same column to form a single field. Thus, in this manner, each field within each record is logically associated with every other field in that particular record.

Exemplary Operating Environment

FIG. 1 and the following discussion are intended to provide a brief, general description of a suitable data-computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments of the Invention

Figure 2:
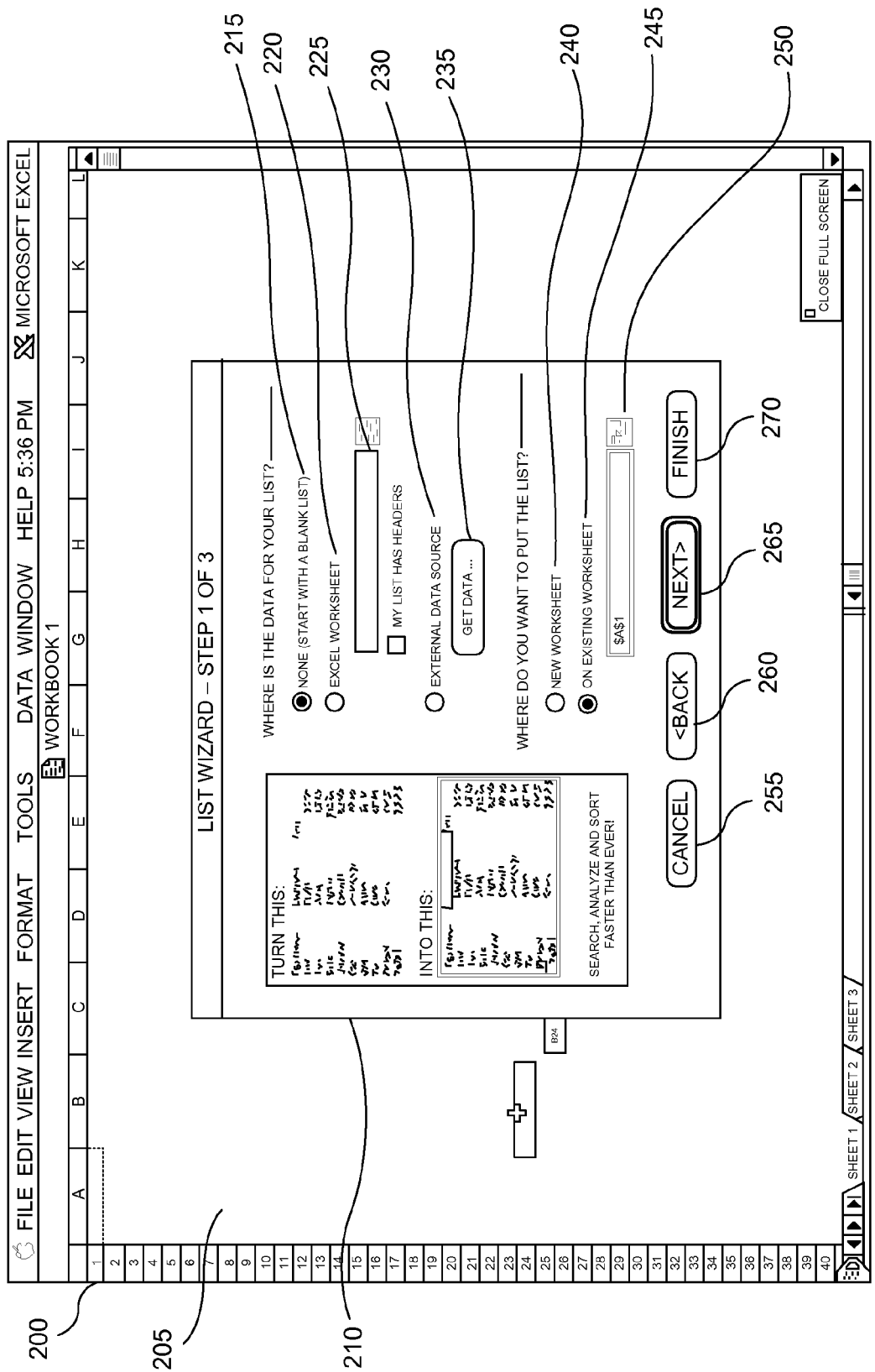
FIG. 2 is screen shot illustrating a dialog box for the first step for creating a List Object within a spreadsheet program worksheet.

FIG. 2 is a screen shot illustrating an exemplary software embodiment of the invention. FIG. 2 illustrates a screen shot of a MICROSOFT EXCEL for MAC spreadsheet program worksheet 200 displaying the first dialog box 210 of the List Wizard. The MICROSOFT EXCEL for MAC worksheet contains a number of cells within a display window 205. The individual cells are the result of the intersection of rows and columns and are used to store individual data items. The first dialog box 210 appears when the user invokes the command to create a List Object within the MICROSOFT EXCEL for MAC spreadsheet program worksheet 200. The main entry point for creating a List Object is through the "List . . . " command on the "Insert" drop-down menu from the Toolbar. Alternatively, the user can create a List Object by selecting the "List . . . " option from the Project Gallery startup dialog box, which appears whenever the MICROSOFT EXCEL for MAC spreadsheet program is launched or the user selects to open a new worksheet from the "File" drop-down menu of the Toolbar from within the MICROSOFT EXCEL for MAC spreadsheet program worksheet 200.

When the user invokes the command to create a List Object, the first dialog box 210 appears within the display window 205 of the worksheet 200. The first dialog box 210 allows the user to identify what data will be used to populate the List Object and where the List Object will be located.

The first step of creating a List Object is determining where the data is located to populate the List Object. In the first dialog box 210 of the List Wizard, the user can select from three options where to place the List Object. First, the user has the option to populate the data from scratch by selecting the "NONE" button 215. This indicates that a blank List Object will be created and that no pre-existing data will be imported into the List Object. In the exemplary embodiment, when the "NONE" button is selected, the normal List Object will be the default and the default location will be on the existing worksheet.

The second and third options presented to the user allow the user to import pre-existing data into the List Object. The user may import the pre-existing data either from a MICROSOFT EXCEL for MAC spreadsheet program worksheet, or from some external source, such as a database application program. To import the data from a MICROSOFT EXCEL for MAC spreadsheet program worksheet, the user would select the "Excel worksheet" button 220, which indicates that the pre-existing data is located within the currently opened MICROSOFT EXCEL for MAC spreadsheet program worksheet. Activating the "Excel worksheet" button 220 enables a reference window 225, in which the user may input a range where the pre-existing data is located within the currently open worksheet. In the exemplary embodiment, when a new List Object is created, the "Excel worksheet" option will be the default when the pre-existing data is located inside a range of cells that is "intelligently" considered to be a List Object. Typically, a List Object is normally a contiguous block of data. Therefore, whenever a portion of the pre-existing data lies within a contiguous block of data, the entire block will be imported into the List Object. Furthermore, the data destination indicating where to place the List Object will default to the existing worksheet with the same range of cells. Keeping the same range of cells transforms the contiguous block of data into a List Object.

Lastly, the user may elect to import the data from an external source, such as database application program, or a remote server connected to a local area network. In this instance, the user indicates that the data is located external to the MICROSOFT EXCEL for MAC spreadsheet program by selecting the "External data source" button 230. When the user selects the "External data source" button 230, a "Get Data" button is enabled. Selecting the "Get Data" button boots up a Query and opens a "Choose Data Source" dialog box. Activation of a Query and using a "Choose Data Source" dialog box to select external data source is well known in the art, and a complete description is beyond the scope of this document.

Once the user has selected where the data for the list is located, the user must select where the List Object will be placed. The user has two choices where to place the List Object. First the user may place the List on a new worksheet, different from the active worksheet currently displayed in the display area 205 by selecting the "New worksheet" item 240. Alternatively, the user may select the "On existing worksheet" item 245 to insert the List Object into the worksheet currently open in the display area 205. Activating the "On existing worksheet" item 245 enables a reference window 250, in which the user inputs a range of cells within the current worksheet where the List Object will be located. Because the range of cells is typically less than an entire worksheet, the List Object will occupy only portion of the worksheet. Therefore, the List Object that is created is a normal List Object, as opposed to a List Sheet and is treated as an individual object within the worksheet.

Once the user has selected the source of the data that will populate the List Object and the destination of the List Object, the user may then proceed to the next step in creating a List Object by activating the "Next" button 265. Alternatively, if the user wishes to cancel or halt the creation of the List Object, the user may select the "Cancel" button 255, which will exit the user from the dialog box.

Figure 3:
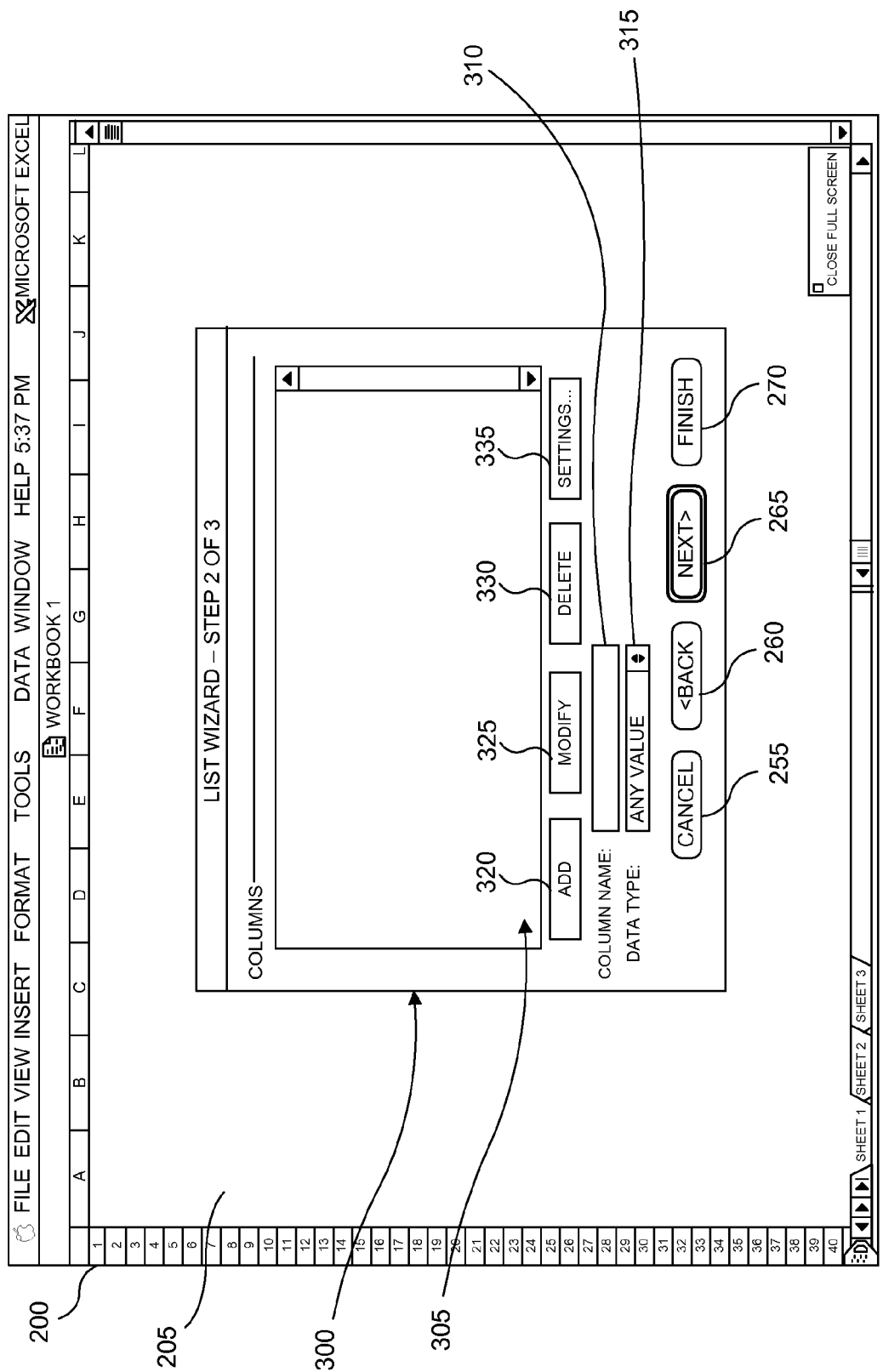
FIG. 3 is a screen shot illustrating a dialog box for the second step for creating a List Object within a spreadsheet program worksheet.

FIG. 3 illustrates a screen shot of a MICROSOFT EXCEL for MAC spreadsheet program worksheet 200 that contains a second dialog box 300 of the List Wizard that appears subsequent to the first dialog box 210 (FIG. 2). The second dialog box 300 is be used to manage the fields in the List Object. The second dialog box 300 contains a "Columns" window 305 for listing the individual columns or fields that are contained in the List Object. The order in which the fields populate the columns window 305 correspond to the order that the fields appear in the List Object from left to right. If the user reorders the columns in the List Object, those changes will be reflected in order of the fields in the "Columns" window 305. The second dialog box also contains a "Column name" box 310 and a "Data types" menu 315 to help manage the fields in the List Object.

To populate the List Object, the user simply types in a name for the field in the "Column name" box 310. The user then selects the data type associated with the Geld from a drop-down "Data types" menu 315. The data types dictates what values can be entered in the cells within the column, or field. This is a type of "preliminary" data validation. Standard data validation rules allow the user to set specific constraints on the data entered. For instance, if a field were to contain decimal values, standard data validation rules would allow a user to select the number of decimal places that an entry may have and the range of values that the entry must lie within. The "preliminary" validation provided by the drop-down "Data types" menu 315 of the present invention, allows the user to specify that only decimal values may be entered in the field (although any decimal value is allowable). By insuring the only decimal values are entered without checking what decimal values are entered, the MICROSOFT EXCEL for MAC spreadsheet program performs a "preliminary" validation of the data anything entered into each field. In the exemplary embodiment, the data type associated with the column may be selected from one of the following: any value, whole number, decimal, currency, counter, text, list, date, time, and calculated field.

If the user has selected to populate the List Object using existing data from the MICROSOFT EXCEL for MAC worksheet, the first row of the data will be used as the header row. Therefore, whatever value appears in the first row of the existing data will be used as the column names and displayed in the "Columns" window 305. Also, the data type will default to the "Any value" data type if no data validation is set on the range of existing data selected from the MICROSOFT EXCEL for MAC worksheet.

Once the user has finished managing the column or field names in the "Column name" box 310, an "Add" button 320, a "Modify" button 325, a "Delete" button 330, and a "Settings" button 335 are enabled. If the "Add" button 320 is selected, the field name is added to the Column name box 305.

Once the field name is placed in the Column window 305, the user may alter the name/data type or the settings options for a particular field name by selecting the "Modify" button 325 or the "Settings" button 335, respectively. The "Modify" button 325 applies the name/data type to the highlighted field name in the Columns window 305 rather than creating a new field with those properties. For example, if a user wants to change the name of a particular field highlighted in the Column window 305, the user can type in the new name in the Column Name box 310 and select the "Modify" button 325. The "Settings" button 335 is actually a superset of the modify function, that the user can not only specify the name/data type of a particular field in the Columns window 305, but all other setting associated with the field, such as the number of decimal places, formatting, and conditional formatting.

Similarly, the user may delete any entry in the Column box 305 by selecting the field they wish to remove and selecting the "Delete" button 330.

After the user has identified all the fields and the associated data types, the user can move on to the next step in creating a List by selecting the "NEXT" button 265. Alternatively the user may cancel the creation of the List by select the "Cancel" button 255, or select the "Finish" button 270 to end the process of creating the List.

Figure 4:
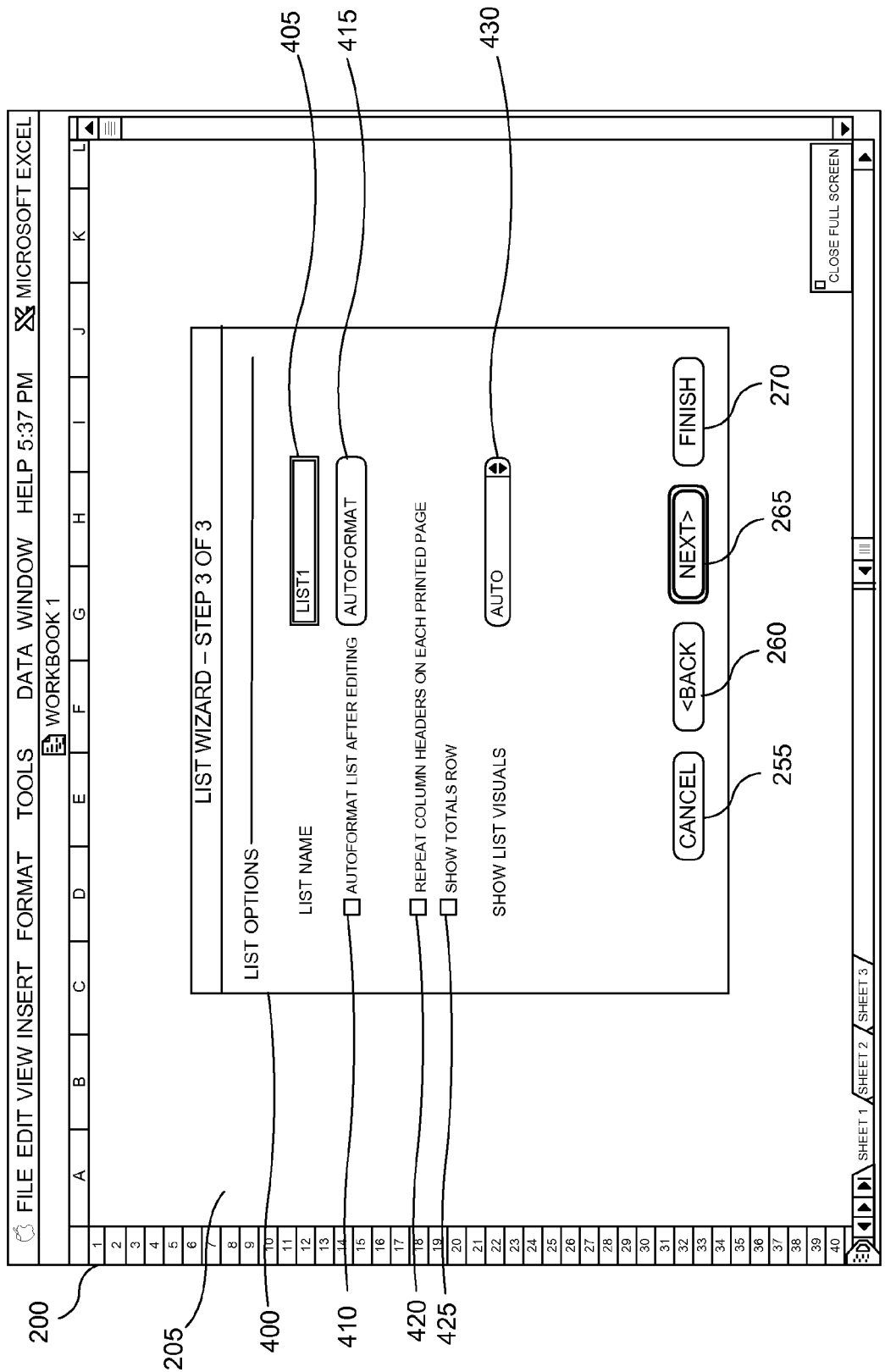
FIG. 4 is a screen shot illustrating a dialog box for the third step for creating a List Object within a spreadsheet program worksheet.

FIG. 4 illustrates a screen shot the MICROSOFT EXCEL spreadsheet program 200 that contains a third dialog box 400 of the List Wizard that appears subsequent to the second dialog box 300 (FIG. 2). The third dialog box 400 stores the list-specific options for each List Object. The third dialog box 400 includes a "List name" box 405 that displays the name of the List Object currently selected. The third dialog box 400 also includes an "Autoformat list after editing" check box 410 that controls whether the autoformat command should be applied to the current List Object currently displayed in the "List Name" box 405. Selecting the "Autoformat list after editing" check box 410 activates the autoformat command, which causes the formatting of the displayed List Object to be reapplied after every operation. A major problem with previous spreadsheet programs was that anytime the user performed an operation on a formatted database, the formatting was destroyed. To restore the formatting, the user had to enter every field in the database and manually reset the format. If the database that the user was operating on was large and/or the user performed a large number of operations, the user would have to continually reformat the database, which was time consuming and lead to numerous errors, which in turn lead to user frustration. However, enabling the "Autoformat list after editing" check box 410 saves the format of the List Object and automatically reapplies that format after every operation, which in turn saves time, reduces errors, and avoids user frustration.

Selecting the "Autoformat list after editing" check box 410 enables the Autoformat button 415. Enabling the "Autoformat" button tunnels the user to an Autoformat dialog box, which allows the user to select the autoformat for the List Object. Whenever the user is tunneled to the Autoformat dialog box, the autoformat that currently set for the List Object is set as the default autoformat value. The autoformat command is well known to those skilled in the art, and a complete description is beyond the scope of this document.

The third dialog box 400 also contains two additional check boxes: a "Repeat Field Headers" check box 420, which reprints the field headers on each successive log page when selected; and a "Show Totals Row" check box 425, which will display the total of each row directly below the last entry for each row, or record of data in the List Object, when selected. The Total Row feature is more fully described in reference to FIG. 5 below. The third window also contains a "Cancel" button 255, a "Back" button 260, a "Next" button 265, and a "Finish" button 270, all of which the have been previously discussed.

Figure 5:
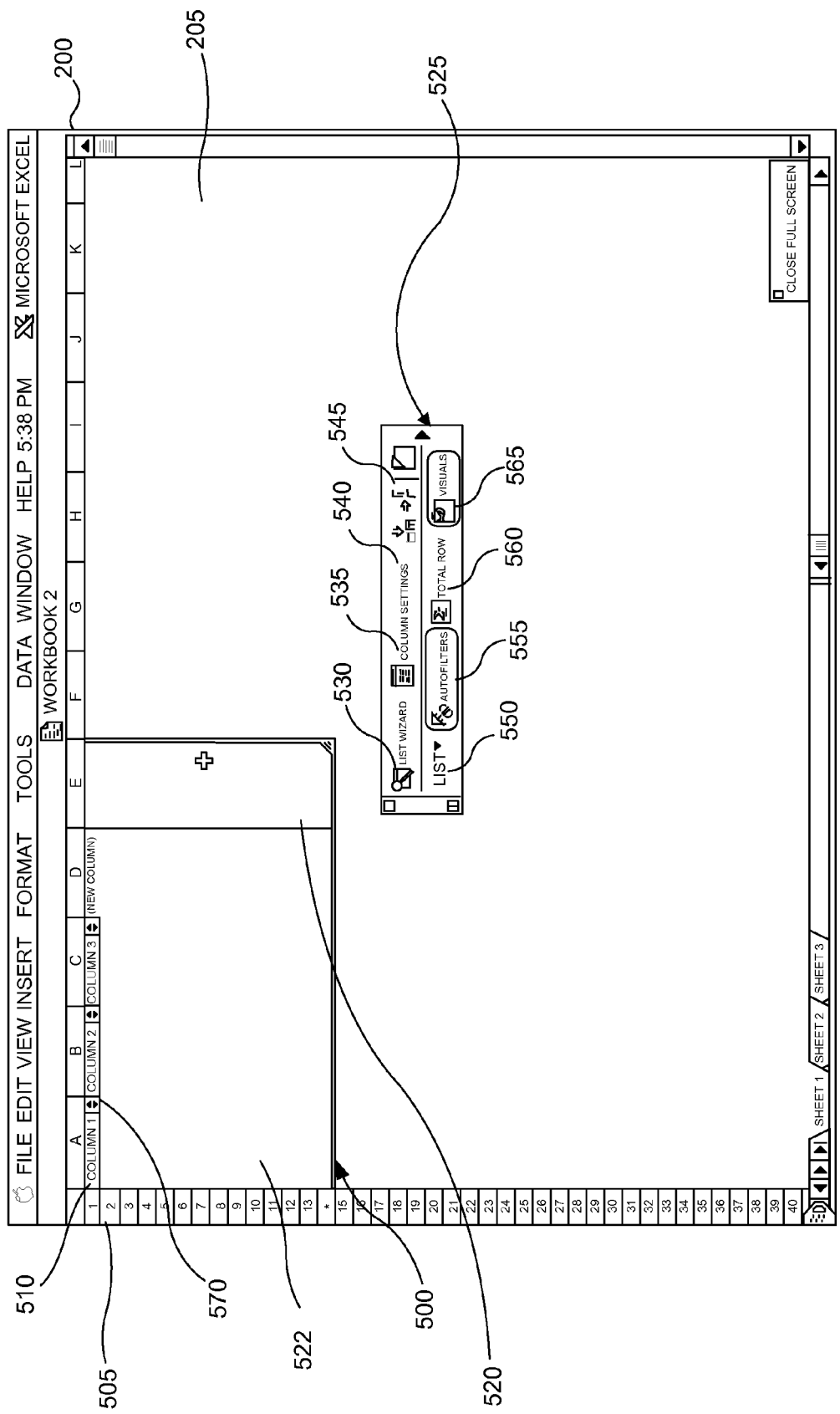
FIG. 5 is a screen shot illustrating a List Object created in a spreadsheet program worksheet.

FIG. 5 is a screen shot of a MICROSOFT EXCEL worksheet 200 displaying a newly created normal List Object 500 within the display area 205. The List Object 500 consists of four main user interface elements: the list frame 505, the field headers 510, the row selector 515, and the cell table 522. The cell table 522 contains the individual data for each record. A logical association is created for each cell within a given record with every other cell within the record. In this manner the collection of data within the cell table is viewed as a single object. Therefore, when data within the List Object 500 is manipulated, such as being sorted, every field within a given record is moved as a single unit. Each field of the individual record remains associated with that particular record, thereby eliminating the possibility that the results different than what the user expected. In previous versions of the MICROSOFT EXCEL for MAC spreadsheet program, each individual cell in the cell table 522 had to be treated individually.

The dimension of the row selector 515 is typically dictated by the default height of the row and will typically be a square in shape. The height of the row selector 515 is equal to the row height and the row selector's width is the same dimension as the height. The row selector 515 associated with the row that contains the active cell will appear raised to the user to allow the user to easily discern which row contains the active cell. Additionally, the row selector 515 will have an indicator to further point out which row contains the active cell. In an exemplary embodiment, the indicator is a black, rightward-pointing arrow in the row selector 515. Although the indicator is described as a black arrow, those skilled in the art will appreciate that indicators other than a black arrow may be used to indicate to the user which row, or record in the database contains the active cell without altering the scope of the invention.

The field headers 510 appear in the upper-most row of the List Object 500 and have the same dimensions of the underlying column. In one embodiment of the present invention, the field headers 510 are centered in the cell, regardless of the formatting of the underlying column. For the column that contains the active cell, the header text is bold and the header appears raised to indicate to the user which column contains the active cell.

In previous versions of the MICROSOFT EXCEL for MAC spreadsheet program, when the number of records exceeds the number rows that can be displayed in the display area 205, the headers 510 would be scrolled off the screen. Therefore it was a difficult task to insert or append new records to the collection of cells because it is easy to forget the headers 510 of each data field. The present invention solves this problem by ghosting out the field header 510 over the top of the normal spreadsheet column headers when the field headers are scrolled off the screen. This insures that the user can always identify the which field he or she is working on when the field header are scrolled off the screen.

Additionally, to allow for consistent printed output and to make formatting easier for the user, the list frame 505, row selector 515, field headers 510, and new row record, which are collectively known as the "List Visuals" need to be toggled off and on. In an exemplary embodiment, the "List Visuals" are toggled off when the active cell lies outside the List Object 500. However, when the active cell is within the List Object 500 and the selection is moving toward a cell that lies outside the List Object 500, a data validation is performed on the current cell. Next, a data validation is performed on the entire record. If the data validation of the current record passes, the List frame 505 is erased and the Toolbar 525 is hidden. Next, a dotted border is drawn around the List cell table 522 to define the List to the user. To toggle the List visuals back on, the user moves the active cell inside the List. This causes the List frame 505 to be redrawn and the List Toolbar 525 to appear.

The List Object 500 may also include an unused space 520 to make inserting new fields easier for the user. The unused space 520 provides a boundary between the frame 505 and the cell table 522, which makes the laying out of reporting information around the List much easier when the user expects to input new data. Also, whenever the List Object 500 expands due to insertion of additional data or due to a user initiated resize operation, the unused space 520 expands with the List Object 500. However, when the cell table 522 is reduced in size due the deletion of records or columns, the unused space 520 may or may not be resized with the cell table 522. If the List frame 505 is perfectly matched to the cell table 522, that is there is no unused space 520, the List frame 505 will be reduced when if the cell table 522 is reduced. However, if there is unused space 505 showing in the List Object 500, then the List frame 505 will not be resized and the unused space will increase when the cell table 522 is reduced.

The List Object 500 also has a List Object Toolbox 525 that contains a variety of tools for manipulating the List Object 500. In an exemplary embodiment, the List Toolbox 525 contains a "List Wizard" button 530, which when selected opens the first dialog box 210 (FIG. 2) of the List Wizard that the user is may insert a new List Object 500 in the worksheet. The Toolbox 525 also contains a "Column Settings" button 535, which allows the user to set the formatting of individual columns within the List 500. An "Insert New Record/Field" button 540 is also included in the List Toolbox 525. It allows the user to insert a new record or field into the List 500 without inserting a new row or column in the worksheet currently open in the display area 205. The List Toolbox 525 also contains an "Autoformat" button 545, a "List" context menu button 550 that displays a drop-down context menu; an "Autofilter" button 555 that allows the user to toggle the autofilter on and off, a Total Row" button 560 that toggles the "Total" row on and off, and a Visuals button 565 that toggles the Visuals on and off.

When the "Total Row" button 560 is toggled on, the total of the values displayed in each field of each column are displayed immediately under each column in a "Total" row. If the List Object 500 is more than one column wide, the first column of the Total row will have the default text "Total" displayed under it and the last column will default to the appropriate function for the type of data contained in the column. If, however the List Object is only one column wide, the one column defaults to having a formula in the "Total" row. Furthermore, if the columns have been filtered, that is only a partial list of the data is visible on screen, then when the "Total Row" button 560 is toggled, only the values of each field displayed on the screen will be totaled. Any field that has been filtered out for a particular column will not be included in the total value displayed in the "Total" row for that column.

For example, if the last column contains numerical data, the appropriate function would be the SUM( ) function, which would produce a total of all the numerical data present in the column. As another example, if the column contains textual data, the appropriate function would be the COUNT( ) function which returns a value equal to the total number of fields in the column that contain textual data. As an illustration, if a column in the List contains a total of 10 fields, and only 7 individual fields contain textual data, the "COUNT" formula would return a value of 7. The remaining columns between first column and the last column are initially, blank, that is no totals are displayed for these columns. Although each column has a total associated with it, the totals are turned off by default. This provides a cleaner appearance of the List to the user.

Every field, or cell in the "Total" row is editable through a drop-down list associated with each cell. If the drop-down list is accessed, a list appears that contains several pre-built formulas that may be inserted into the cell. In the exemplary embodiment, the drop-down menu contains the following pre-built formulas: "No Formula," "Average," "Count," "Count Nums," "Max," "Min" "Sum," and "Other . . . " If the "No Formula" option is selected, the no value is displayed in the cell. If, however, any of the other pre-built formulas are selected, the appropriate function is inserted into the cell in the "Total" row. The entire column range is used as the parameter for the pre-built formulas. The default formula when first creating the "Total" row is the SUM( ) function for numerical data and the COUNT( ) function for text data. However, if the "Other . . . " option is selected, an "Insert/Function" dialog box is displayed, which allows the user to select any formula supported by the MICROSOFT EXCEL for MAC spreadsheet program.

Additionally, each field headers 510 also contains an AutoFilter/Sort button 570, which when activated, displays a drop-down "AutoFilter and Sort" menu. The "AutoFilter and Sort" drop-down menu contains the same autofilter functions as previous versions of the MICROSOFT EXCEL for MAC spreadsheet programs, however, the drop-down menu also contains an entry point for the sort command. Selecting the AutoFilter/Sort button 570 presents the user with the option to sort the normal List Object 500 in either ascending or descending order using the corresponding field as the sort key. This provides the user with a simple and efficient way to sort the normal List Object.

Although the present invention has been described in terms of the normal List Object, the above-described features are equally applicable to the List Sheet, which is a normal List Object whose range is the worksheet's entire used range.

Figure 6:
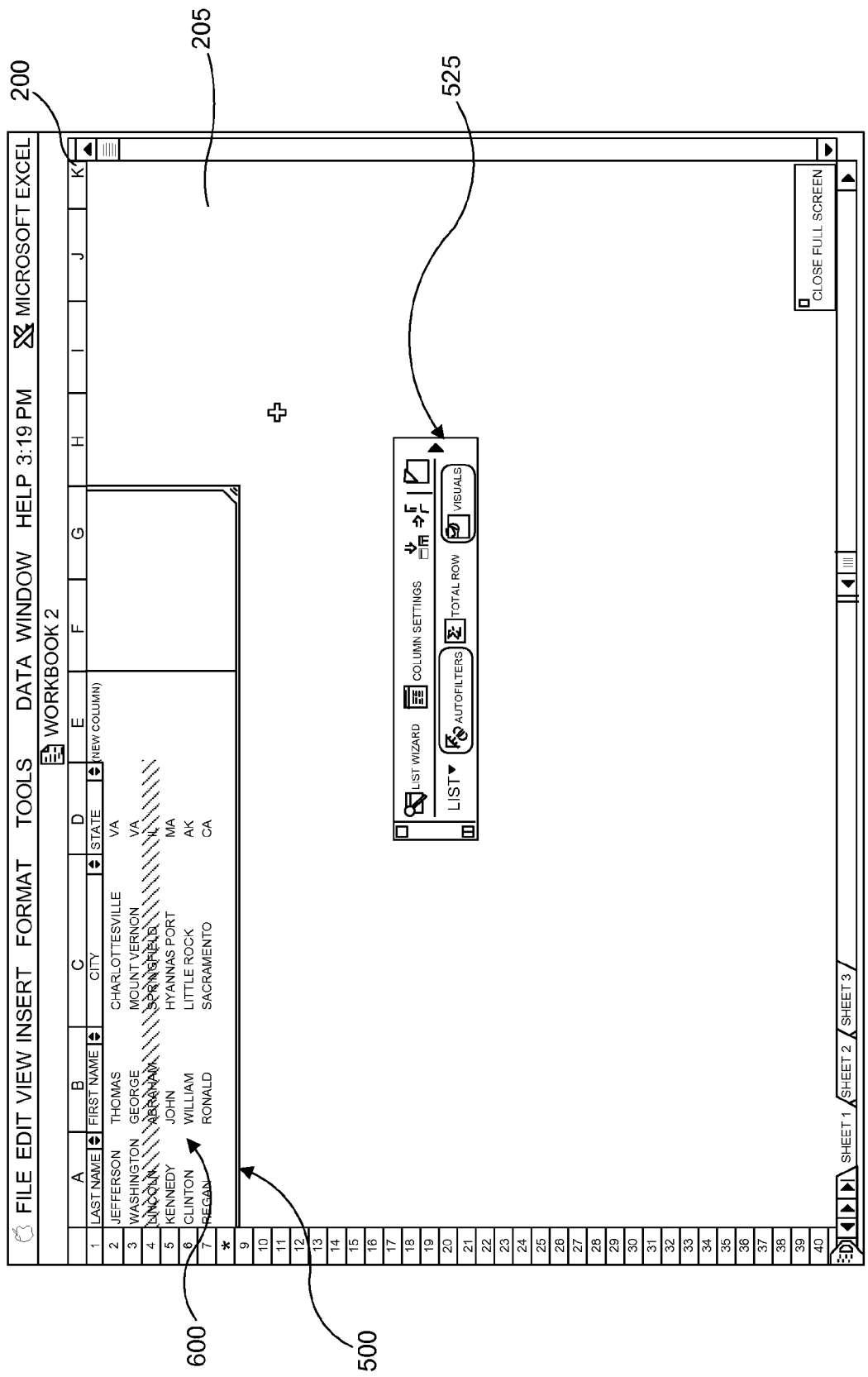
FIG. 6 is a screen shot illustrating an example of a List Object in a spreadsheet program populated with a contact list using the present invention.

FIGS. 6–9 are screen shots illustrating an example of sorting a List Object 500. FIG. 6 is a screen shot illustrating a normal List Object 500 containing a contact list 600 that has seven individual records that are placed in random order and contain the fields: "Last Name," "First Name," "City," and "State." In the illustration the contact list 600 contains the following data: "Jefferson," "Thomas," "Charlottesville," "VA"; "Washington," "George," "Mount Vernon," "VA"; "Lincoln," "Abraham," "Springfield," "IL"; "Kennedy," "John," "Hyannas Port," "MA"; "Clinton," "William," "Little Rock," "AK"; and "Reagan," "Ronald," "Sacramento," "CA."

Figure 7:
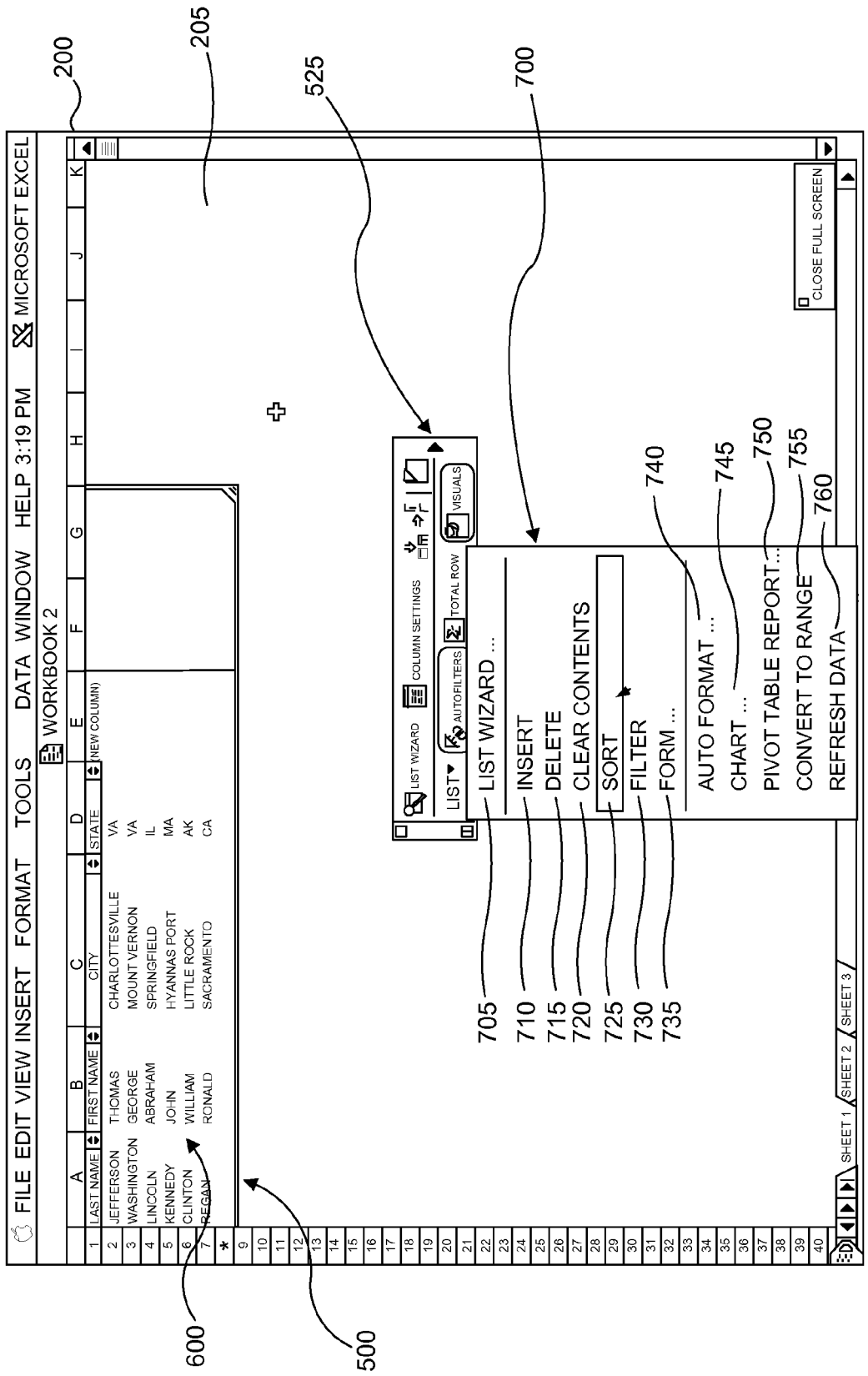
FIG. 7 is a screen shot illustrating an example of selecting a SORT command from a drop-down window for sorting a List Object in a spreadsheet program populated with a contact list using the present invention.

FIG. 7 is a screen shot illustrating the selection of the Sort command 715 from the List Object context menu 700. To select the Sort command, the active window must first be placed in the List Object 500. Next, the "List" button 530 is selected, which enables the List context menu 700. The List context menu 700 contains a number of commands that may be used to manage the data within the List Object 500. In the exemplary embodiment of the invention, the List Object context menu 700 contains an "List Wizard" command that invokes the List Wizard to create a separate List Object in the current worksheet, an "Insert" command 710, a "Delete" command 715, a "Clear Contents" command 720, a "Sort" command 725, a "Filter" command 730, a "Form" command 735, an "AutoFormat" command 740, a "Chart" command 745, a PivotTable Report" command 750, a "Convert to Range" command 755, and a "Refresh Data" command 760. Those skilled in the art will appreciate that, with the exception of the List Wizard command 705, the commands displayed on the List Object context menu 700 are identical to the commands used in previous versions of the MICROSOFT EXCEL for MAC spreadsheet program to manage data stored in a database structure.

The use of these commands is well known by those skilled in the art, and a detailed description is beyond the scope of this document.

In addition to being activated from the List Toolbar 525, the List context menu 700 may be accessed by invoking the "DATA" submenu from the menu bar of the main MICROSOFT EXCEL window 200.

Figure 8:
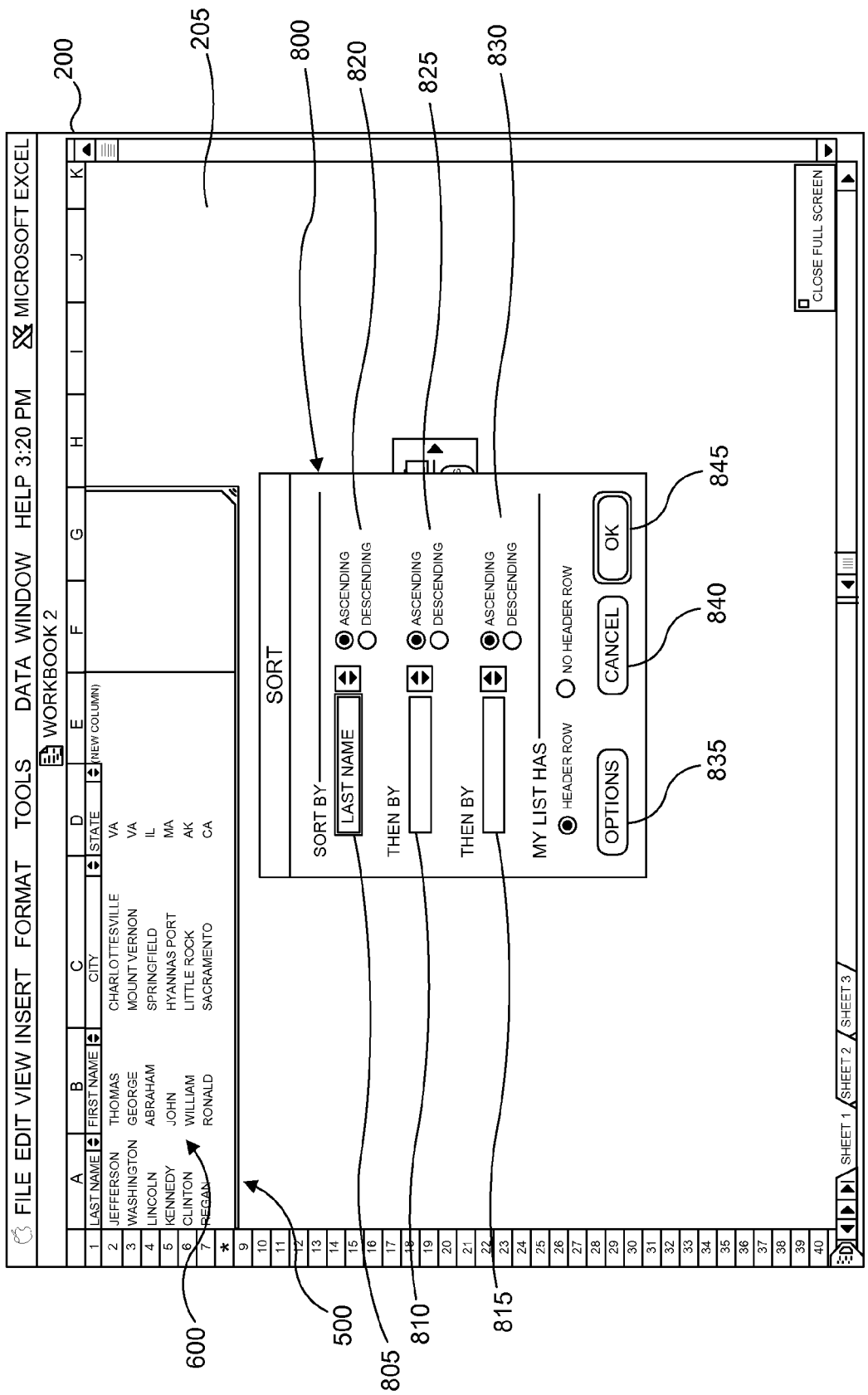
FIG. 8 is a screen shot illustrating an example of selecting the sort criteria for sorting a List Object in a spreadsheet program using the present invention.

FIG. 8 is a screen shot illustrating the result of selecting the "Sort" command 720 from the List context menu 700. FIG. 8 illustrates the "Sort" dialog box 800, which is used to define up to three sort keys that are used to sort the data. The Sort dialog box 800 contains a first scroll window 805, a second scroll window 810, and a third scroll window 815 for selecting the three sort keys. The sort keys are selected from the fields in the database 600. Each sort key may be sorted either in ascending or descending order depending on which element button is selected for each (820, 825, 830) sort key. The field header that is the sort key will appear as a depressed button. Additionally, when a field that is a primary sort key contains the active cell, the field header 510 will appear as a depressed button, plus contain bolded text. As is seen in the illustration, field header in column A appears as a depressed button and the field name, "Last Name", appears as bolded text due to the fact that the active cell is cell A2, which is located in the List 500. Once the sort keys are defined, the user may either select the "Cancel" button 840, which will abandon the "Sort" command or select the "OK" button 845, which will causer the records in the List 500 to be sorted alphabetically by the "Last Name" field.

Figure 9:
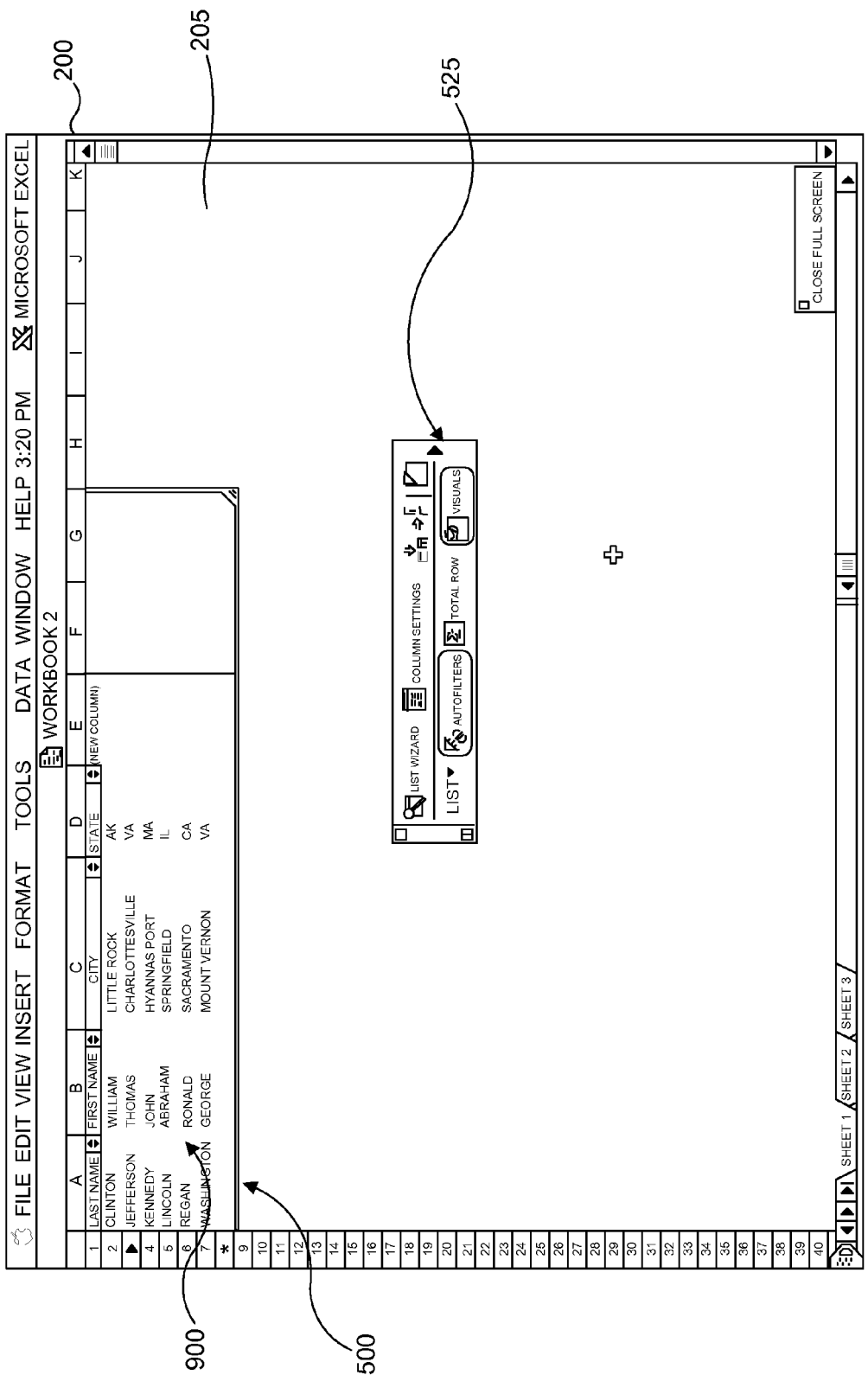
FIG. 9 is a screen shot illustrating the results of invoking the SORT command for a List Object in a spreadsheet program using the present invention.

FIG. 9. illustrates the results of the sort command from FIG. 8. The contact list 600 has been transformed into a new contact list 900 that is sorted in ascending alphabetical order based on the "Last Name" field.

Figure 10:
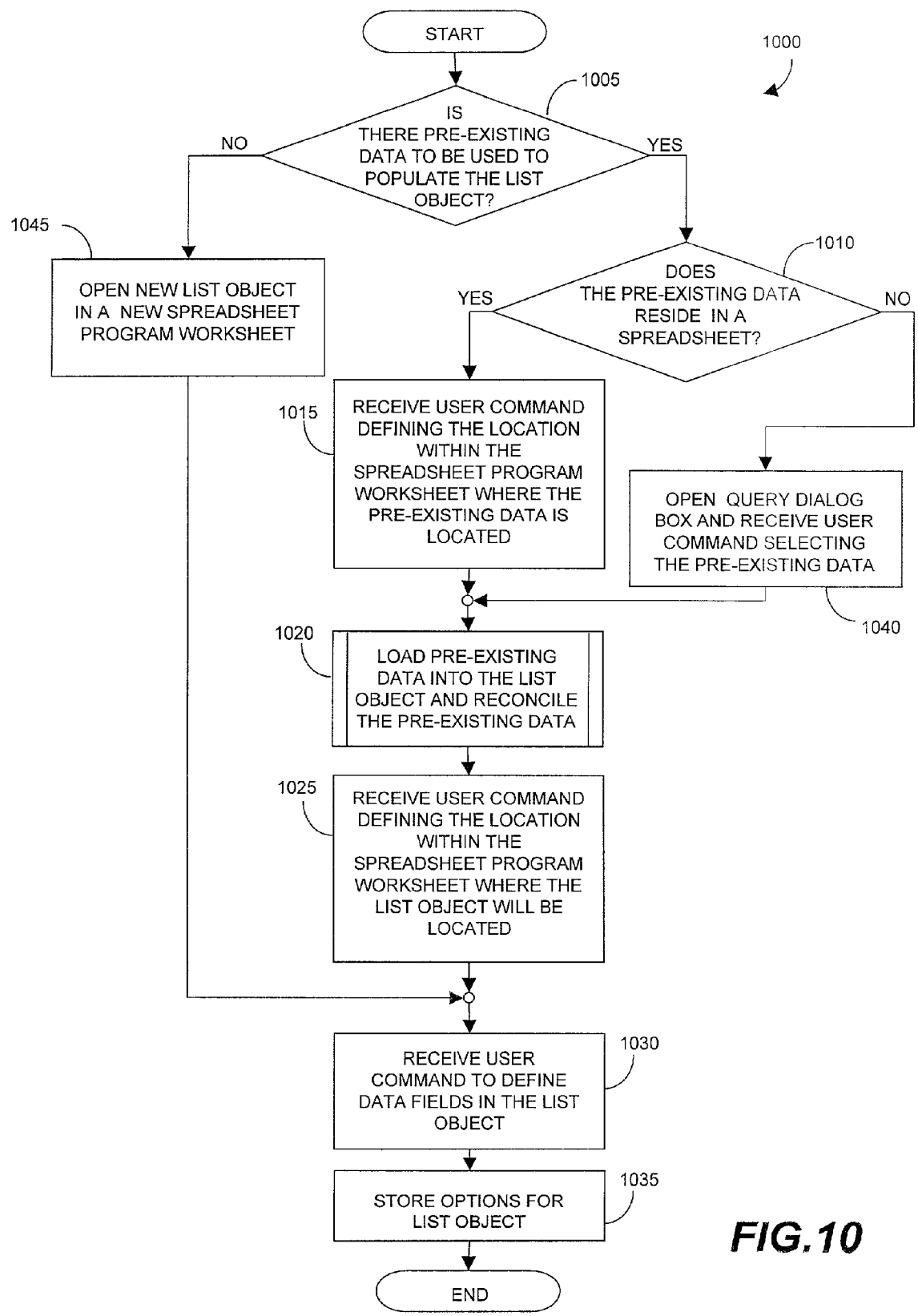
FIG. 10 is a logic flow diagram illustrating an exemplary method of creating a List Object in a spreadsheet program using the present invention.

FIG. 10 is a logic flow diagram illustrating a routine 1000 for creating an embedded database, also known as a List Object, within the MICROSOFT EXCEL for MAC spreadsheet program. Routine 1000 begins at step 1005, in which a determination is made whether the List Object is to be populated with pre-existing data. Pre-existing data may reside either at the local terminal or at a remote site. If pre-existing data will be used to populate the List Object, the "YES" branch is followed to step 1010. In step 1010, the determination is made whether the pre-existing data is located within a spreadsheet program worksheet. If the pre-existing data is located within a spreadsheet program worksheet, then the "YES" branch is followed to step 1015, in which a user command is received that defines the location within the spreadsheet program worksheet where the pre-existing data resides. The location is typically a range of cells within the current worksheet or may be a range of cell within another worksheet.

However, if the pre-existing data is not located within a spreadsheet program worksheet, then the pre-existing data is located at a remote site, such as a remote database. In this case, the "NO" branch is followed to step 1040, where a query dialog box is opened and the user navigates to the remote site containing the pre-existing data. The user can then select the pre-existing data from the remote site to populate the List Object.

Once the user supplies the location of the pre-existing data, the pre-existing data is loaded in to the List Object at step 1020. Step 1020 is then followed to step 1025, in which user commands are receive to define the location of the List Object within the spreadsheet program worksheet. Typically, the user provides a range of cells in the current MICROSOFT EXCEL for MAC spreadsheet program worksheet as the target location for the List Object. Alternatively, the user may select a new worksheet to put the List Object. Once the user has defined the location where he or she would like the to put the List Object, step 1025 is followed by step 1030. At step 1030, the user defines the data fields within the List Object. In defining the data fields, the user inputs a name for each data field and sets the data type for each data field. In the exemplary embodiment, the user may define the data type as any value, a whole number, a decimal, currency, counter, text, list, data, time, or calculated field. Once the user defines the data field, the user may add, modify, or delete any data field in the List Object.

Step 1030 is followed by step 1035 where the options that define the List Object are saved. Not only are the data field settings or formatting saved, but also each field in each record is logically associated with every other field in the record. In this way, the entire collection of data within the List Object is treated as a single unit. Finally, step 1035 is followed by the "END" step.

Returning to step 1005, if the determination is made that no pre-existing data is to be used to populate the database, then the "NO" branch is followed to step 1045, in which a new spreadsheet program worksheet is opened. The new spreadsheet is set as the default for defining the destination of the List Object. Step 1045 is followed by step 1030, in which the user defines the data fields in the List Object. Step 1030 is followed by step 1035 where the options that define the List Object are saved. Step 1035 is then followed by the "END" step.

Figure 11A:
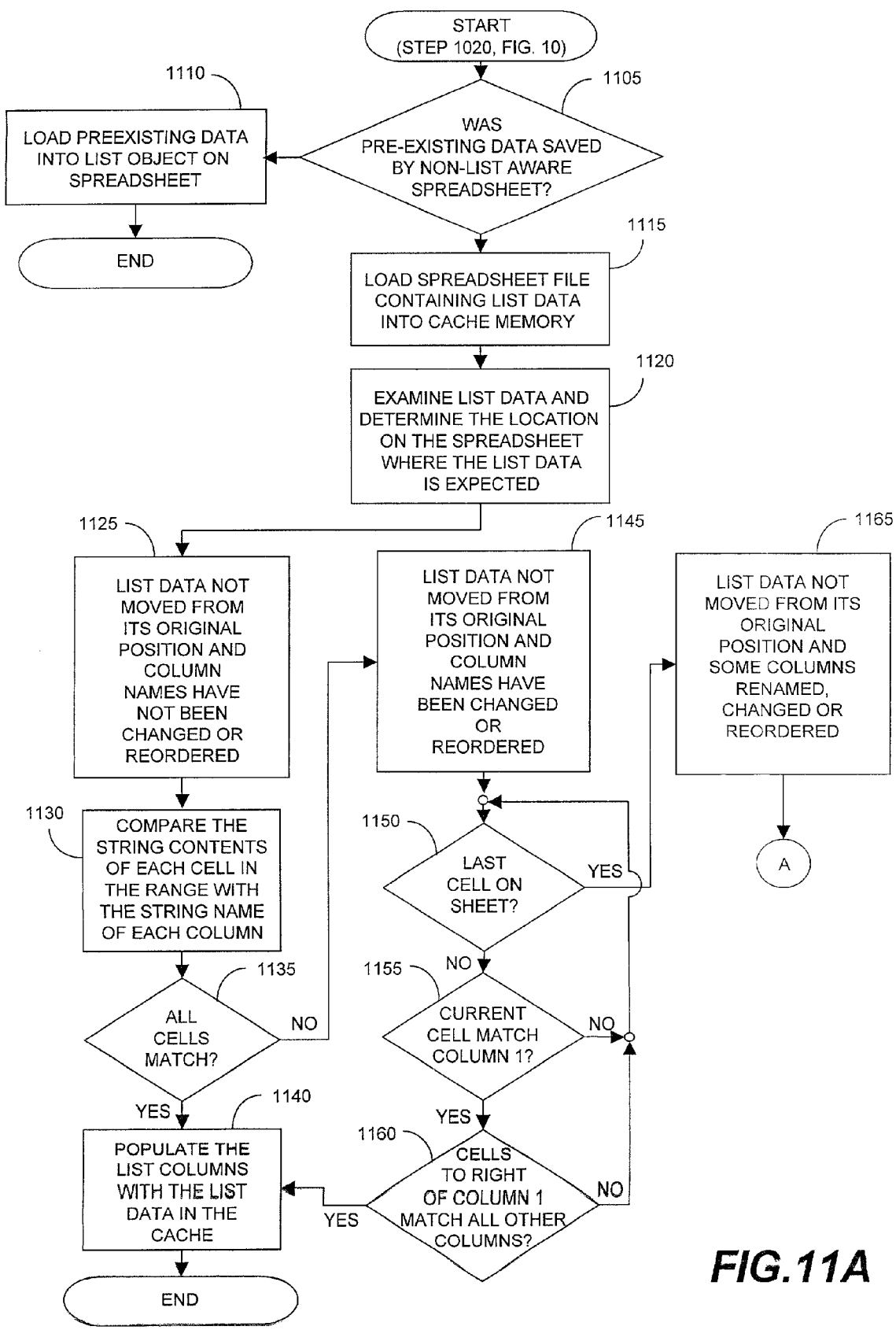
FIGS. 11A, 11B, and 11C, hereinafter collectively referred to as FIG. 11, are a logic flow diagram illustrating an exemplary method of reconciling List data on a load operation.
Figure 11B:
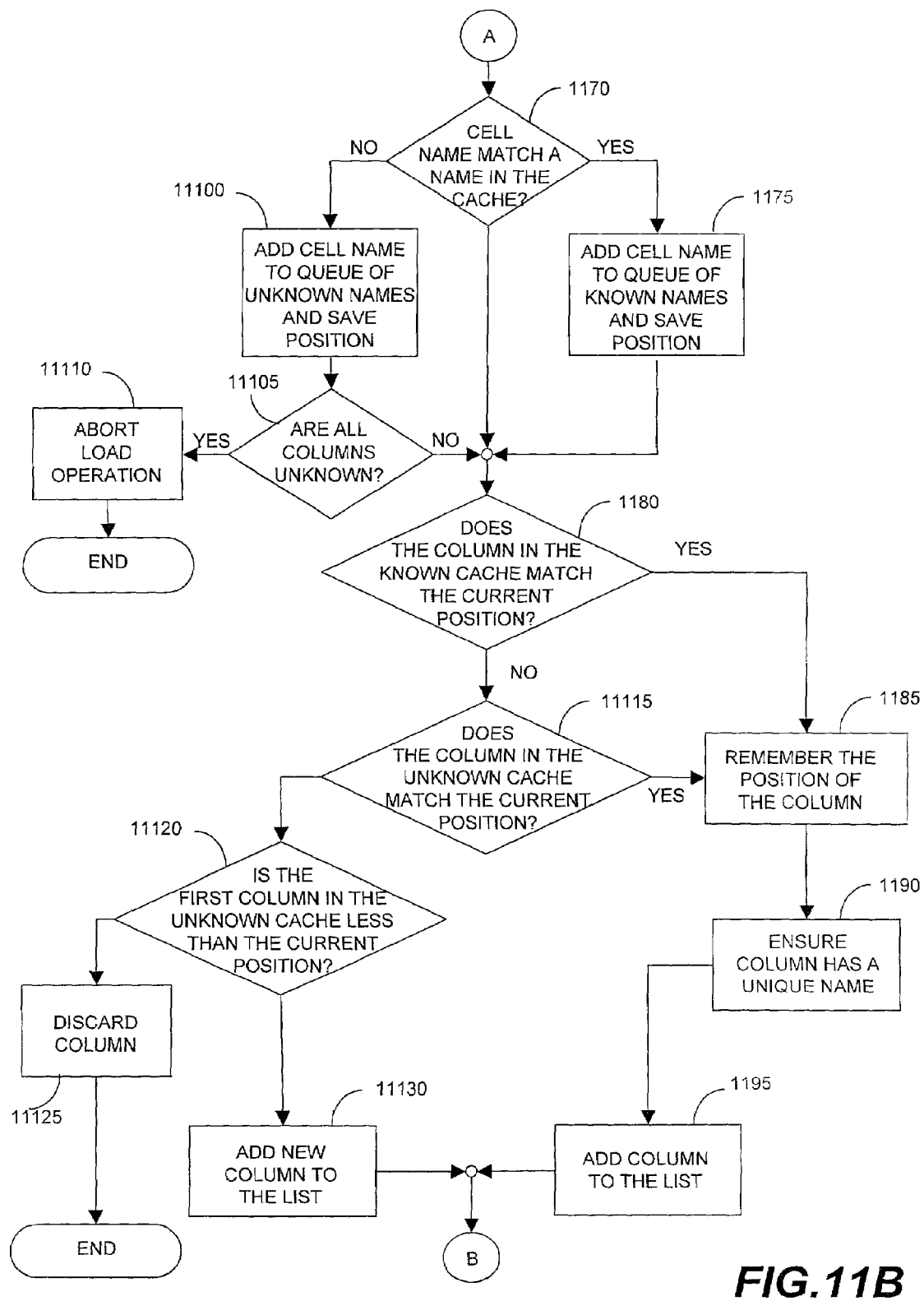
Figure 11C:
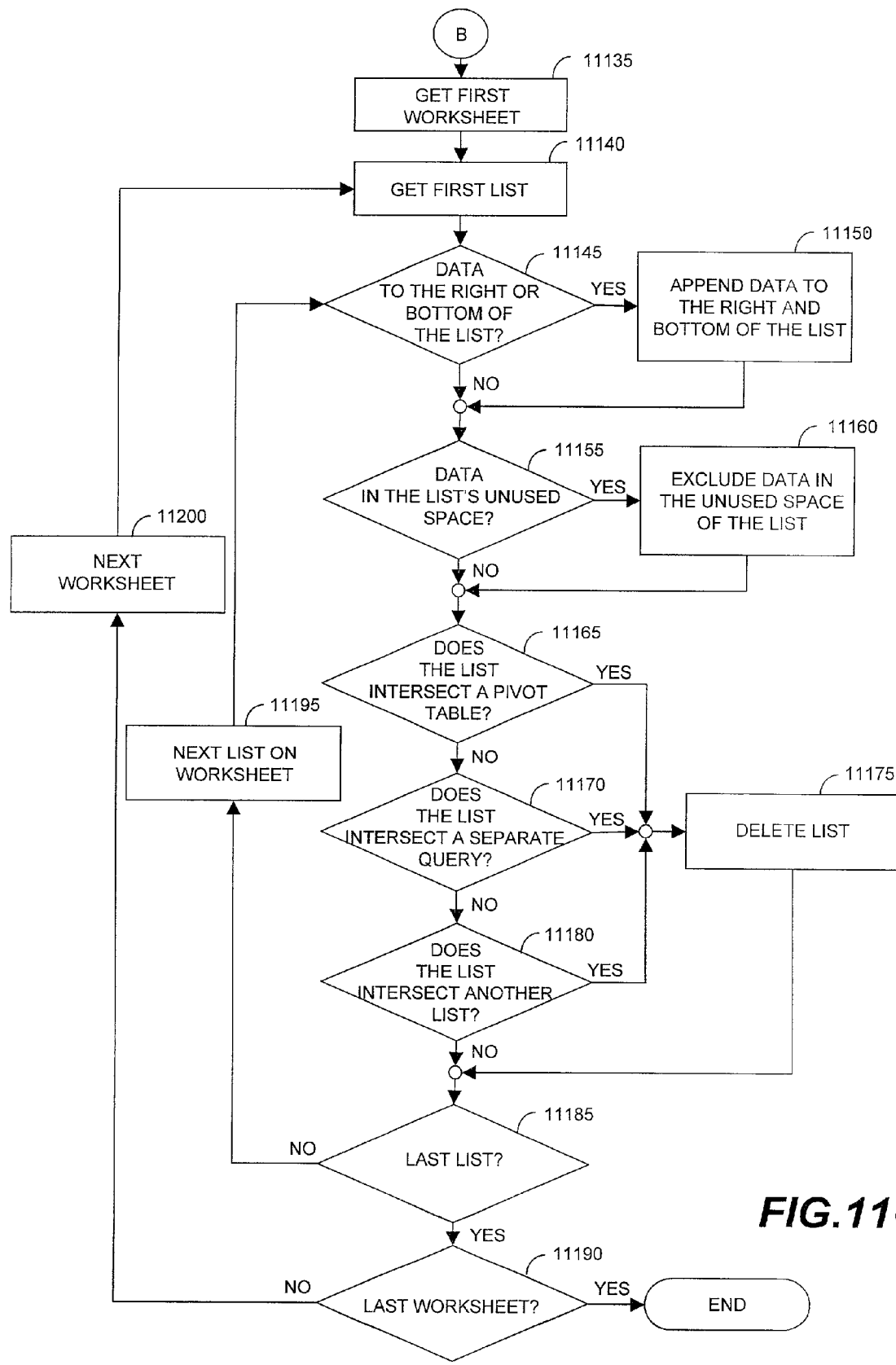

FIG. 11 is a logic flow diagram illustrating routine 1020 in FIG. 10, which reconciles the List Object upon loading pre-existing data. The routine 1020 begins at step 1105, in which the determination is made whether a non-list aware version of the MICROSOFT EXCEL for MAC spreadsheet program was last used to save the data. For purposes of this application, a non-list aware version of the MICROSOFT EXCEL for MAC spreadsheet program is intended to mean that the specific version (version 8.0 and earlier) of the MICROSOFT EXCEL for MAC spreadsheet program (or any version of the MICROSOFT EXCEL for WINDOWS spreadsheet program) is incapable of storing a collection of data as a List Object. If the determination is made that a non-list aware version was not used to last save the pre-existing data, then the "NO" branch is followed to step 1110 where the pre-existing data is imported directly into the spreadsheet as a List Object. Step 1110 is then followed by the "END" step.

However, if a non-list aware version of the MICROSOFT EXCEL for MAC spreadsheet program was used to last save the pre-existing data, then the "YES" branch is followed to step 1115. At step 1115, the pre-existing data is temporarily loaded into a cache memory. Step 1115 is followed by step 1120, in which the pre-existing data is examined to determine where it should be expected to be located on the worksheet.

Once the position of the pre-existing data has been identified, three separate cases of reconciling the data are examined: 1) the pre-existing data has not been moved and the column names have not been renumbered or reordered; 2) the pre-existing data has been moved but the column names have not been renumbered or reordered; and 3) the pre-existing data has not been moved but some columns have been renumbered or reordered.

Step 1120 is followed by step 1125, which begins the first case where the pre-existing data has been moved from its original position in the spreadsheet and the columns have not been renumbered or reordered. Step 1125 is followed by step 1130, where string contents of each cell are compared to the string name of each column. Step 1130 is followed by step 1135, in which the determination is made whether the cell contents of every each cell matches the string contents of each column of the pre-existing data in the cache, If the string contents of each cell in the range match the string name of each column, the assumption is made that the list has been found and the "YES" branch is followed to step 1140. At step 1140, the list columns are populated from the list data stored in the cache memory. Next, step 1140 is followed by the "END" step.

If, however, at step 1135 the contents of every cell do not match the string name of each column, then the routine proceeds along the "NO" branch to step 1145. Step 1145 begins the second case, in which the list data has been moved from its original position, but the column names have not been changed or reordered in the list. Step 1145 is followed by step 1150 where the determination is made whether the last cell in the list has been reached. If the last cell has not been reached, the "NO" branch is followed to step 1155.

At step 1155, the determination is made whether the current cell in the sheet matches the column 1 of the list data. If determination is made that the current cell matches the data in column 1 from the list data, then the "YES" branch is followed to step 1160. At step 1160, the determination is made whether the remaining cells to the right of the first cell match the remaining cells in the remaining columns of the list data stored in the cache memory. If the remaining cells to the right of the first cell match the cells in the remaining columns, then the correct list in the file has been located, and the "YES" branch is followed to step 1140. At step 1140, the list columns are populated with the data stored in the cache memory. Step 1140 is followed to the end step.

If, on the other hand, the determination is made at step 1160 that the remaining cells to the right of the current cell do not match the cells in the remaining columns of the list data stored in the cache memory, then the correct list data has not been found and the "NO" branch is followed, which loops back to step 1150 to determine whether the last cell on the sheet has been reached. If the last cell on the sheet has been reached and no match between the cells on the sheet and the list data in the cache memory have been found, then the "YES" branch is followed to step 1165, which is the third case that is examined.

The third case examines whether the list data has not moved from its original position and some columns have been renamed, changed, or reordered. Step 1165 is followed by step 1170, in which the determination is made for each cell in the row of the list whether the cell's name matches a name in the list data stored in the cache. If the cell's name matches a name in the cache of columns, the "YES" branch is followed to step 1175. At step 1175, the cell's name is added to a queue of "known" names and the position of the original position of the cell is saved.

Step 1175 is followed by step 1180, in which the determination is made whether the column in the list data stored in the known cache match the current position of the list data selected in the worksheet. If the list data stored in the known cache matches the current position of the list data selected in the worksheet, then the "YES" branch is followed to step 1185. At step 1185, the position of the current column in the worksheet is stored in a temporary memory location. Step 1185 is followed by step 1190, in which the stored columns are examined to insure that each column has a unique name. Once the column has a unique name, step 1190 is followed by step 1195, in which the column is added to the list data.

Returning to step 1180, if the determination is made that the column in the known cache does not match the current position on the worksheet then the "NO" branch is followed to step 11115, wherein the determination is made whether the column in the unknown cache matches the current position. If the column in the unknown cache matches the current position, the "YES" branch is followed to 1185, where the current position of the column is stored in a temporary location. Step 1185 is followed by step 1190, where the column is ensured to have a unique name.

If, however, at step 11115, the determination is made that the column in the UNKNOWN cache does not match the column in the current position, the "NO" branch is followed to step 11120, in which another determination is made whether the first column in the UNKNOWN cache is less than the current column position. If the determination is made that the first column in the UNKNOWN cache is less than the current column position, then the "YES" branch is followed to step 11125. At step 11125, the column in the UNKNOWN cache is discarded because since the current column position is greater than the column, it should have already been added to the list data and therefore, it should not be considered a second time.

Once all the columns have been added to the list as an existing column in step 1195 or as a new column in step 11130, the routine proceeds to step 11135, in which the first worksheet in the file is examined for List data. Because each MICROSOFT EXCEL for MAC spreadsheet program file can have multiple worksheets, each individual worksheet must be inspected for List data.

Next, step 11135 is followed to step 11140, where the first instance of List data in the worksheet is selected. Just as a single MICROSOFT EXCEL for MAC spreadsheet program file can have multiple worksheets, each worksheet may contain multiple instances of List data. Therefore, each instance of List data contained in each worksheet is inspected individually.

Once the first instance of List data is selected, step 11140 is followed by step 11145. In step 11145, the determination is made whether the any data exists to the right or bottom of the selected List data. If the determination is made that the data exists either to the right or bottom of the selected lists data, the "YES" branch is followed to step 11150, where the data is appended to the List data. Routine 1100 then proceed to step 11155. If however, the determination is made that no data lies to the right or below the currently selected List data, then step 11145 proceeds to directly to step 11155 along the "NO" branch.

At step 11155, the determination is made whether any data is present in the List data's unused space. If data is present in the unused space of the currently selected List data, the "YES" branch is followed to step 1160, where the data is excluded from the List data's unused space. The data in the unused space is excluded by reducing the size of the unused space of the selected List data so that the unwanted data lies outside the List data. Step 11160 is then followed by step 11165. If however, at step 11155 the List data's unused space does not contain any additional data, then the "NO" branch is followed directly to step 11165.

At step 11165, the determination is made whether the selected List data intersect a Pivot Table. If the List data that is currently selected in the worksheet intersects a Pivot Table, then the "YES" branch is followed to step 11180 where the currently selected List data is deleted from the worksheet because the List data has been loaded incorrectly and should be discarded. Pivot Tables are available in non-list aware versions of the MICROSOFT EXCEL spreadsheet and therefore, will be reconciled during the load operation. However, in attempting to load list data from a file created with a non-list aware version of the MICROSOFT EXCEL spreadsheet program, the data may be loaded incorrectly.

If however, the currently selected List data does not intersect a Pivot Table on the current worksheet at step 11165, the "NO" branch is followed to step 11170 where the determination is made whether the currently selected List intersects a separate query. If the currently selected List data intersect a query, then the "YES" branch is followed to step 11180, where the List data is deleted. Just as with the Pivot Table, queries are supported by previous versions of the MICROSOFT EXCEL spreadsheet program and therefore, are considered to be loaded correctly from the file. Thus, if the currently selected List data intersects, or overlaps an existing query, the List data is assumed to have been loaded incorrectly and is discarded.

On the other hand, if the currently selected List data does not intersect any existing query, then the "NO" branch is followed to step 11175, wherein the determination is made whether the currently selected List data intersect with any other previously loaded List data. If the currently selected List data intersects any previously loaded List data, the currently loaded data is assumed to be incorrect and is deleted at step 11180. However, if the currently selected List data does not intersect any existing List data, then the "NO" branch is followed to step 11185.

At step 11185, the determination is made whether the last List data contained in the worksheet has been reached. If the last List data on the worksheet has not been reached, then the "NO" branch is followed to step 11195, in which the next instance of List data in the worksheet is selected. Step 11195 then branches back to step 11145 to begin the process again for the newly selected List data.

If the last List data on the worksheet has been reached, then the "YES" branch is followed to step 11190, in which the determination is made whether the last worksheet in the files has been loaded. If the last worksheet has been loaded, then the "YES" branch is followed to the "END" step. If on the other hand, the last worksheet in the file has not been examined, then the "NO" branch is followed to step 11200, in which the next worksheet in the file is selected. Step 11200 then branches back to step 11140, wherein the first instance of List data in the currently selected worksheet is retrieved. Step 11140 is then followed by step 11145, which begins the process of examining the List data on the currently selected worksheet. However, if the last worksheet in the file has been reached, the "YES" branch is followed to the "END" step.

In summary, the present invention is directed towards a graphical method for creating a List Object in a spreadsheet program. The resulting individual fields within each record of the List Object are logically associated to every other field within that particular record. Therefore, the invention allows the spreadsheet program to manipulate the individual records using standard database rules.

Alternative embodiments will be apparent to those skilled in the art to which the present invention pertains without departing from its spirit and scope. Accordingly, the scope of the present invention is described by the appending claims and is supported by the foregoing description.

We claim:

1. A method of creating a list in an electronic spreadsheet program, the list comprising a plurality of records, wherein each record comprises a plurality of fields, comprising the steps of:
   (a) receiving a user command to create the list, wherein said user command enables a user to create the list by guiding a user through performance of a plurality of sequences, each sequence comprising a plurality of steps that result in the creation of the list;
   (b) performing a first sequence comprising the steps of:
      (i) determining whether pre-existing data is to be imported into the list;
      (ii) if pre-existing data is to be imported into the list, determining where the pre-existing data is located; and
      (iii) if no pre-existing data is to be imported into the list, creating a worksheet in the electronic spreadsheet program;
   (c) performing a second sequence, subsequent to the first sequence, comprising the step of defining the plurality of fields in the list, each field comprising a plurality of characteristics; and
   (d) performing a third sequence subsequent to the second sequence, comprising the steps of:
      (i) enabling a user to create the list in a manner that determines whether the list comprises one of:
         (1) a list object, which occurs if the user inserts the list into an electronic spreadsheet program worksheet, such that different data that are not part of the list object can be included within a different portion of said worksheet; and (2) a list sheet, which occurs if the user inserts the list into the electronic spreadsheet program worksheet, such that different data that are not part of the list cannot be included within said worksheet; and (ii) creating a continuing association between each field within each record such that each field remains associated with other fields within each record when the record is manipulated.

2. The method of claim 1, wherein the step of determining whether pre-existing data is to be imported into the list further comprises the steps of:

(a) determining whether the pre-existing data is located in an existing electronic spreadsheet program worksheet;

(b) if the pre-existing data is located in the existing electronic spreadsheet program worksheet, prompting the user to input a range within the existing electronic spreadsheet program worksheet comprising the pre-existing data; and (c) if the pre-existing data is not located in the existing electronic spreadsheet program worksheet, opening a Query dialog box operable for receiving user commands to navigate to a location that contains the pre-existing data.

3. The method of claim 1, wherein the first sequence further comprises the step of determining the location of where to place the list.

4. The method of claim 3, wherein the location to place the list is selected from one of a new electronic spreadsheet program worksheet and an existing electronic spreadsheet program worksheet.

5. The method of claim 1, wherein the step of defining the fields in the list comprises at least one of the steps of: adding a new field, modifying a field, deleting a field, and altering at least one of the characteristics of a field.

6. A computer-readable medium containing computer-executable instructions for displaying a plurality of dialog boxes that enable a user to graphically create a list comprising a plurality of records, each record comprising a plurality of fields in a spreadsheet, the computer-executable instructions, when executed, carrying out the steps of:

(a) displaying a first dialog box operable for enabling a user to selectively create the list so that it comprises one of:

(i) a list object, which occurs if a user inserts data into an electronic spreadsheet program worksheet, such that different data can be included within a different portion of the worksheet that is not associated with the list object; and (ii) a list sheet, which occurs if a user inserts data into the electronic spreadsheet program worksheet, such that different data that are not part of the list cannot be included within a different portion of the worksheet;

(b) displaying a second dialog box operable for receiving user commands to define a plurality of options associated with each of the plurality of fields in the list;

(c) displaying a third dialog box, operable for receiving user commands to save the plurality of options associated with each field;

(d) creating the list in a worksheet within the spreadsheet as indicated in step (a); and (e) creating a continuing association between each field within each record such that each field remains associated with other fields within each record when the record is manipulated.

7. A user interface operable for graphically creating a list comprising a plurality of records, each record comprising a plurality of fields within a spreadsheet, the user interface comprising:

(a) a first dialog box comprising:

(i) a first plurality of input elements operable for receiving user commands to determine a location of data to import into the list; and (ii) a second plurality of input elements operable for receiving user commands to determine the location where the list will be placed in the spreadsheet such that a user is enabled to determine that the list comprises one of:

(1) a list object, which occurs if the user inserts data into an electronic spreadsheet program worksheet, such that different data that are not part of the list can be included within a different portion of said worksheet; and (2) a list sheet, which occurs if the user inserts the data into the electronic spreadsheet program worksheet, such that different data that are not part of the list cannot be included within a different portion of said worksheet;

(b) a second dialog box comprising:

(i) a window for defining the fields in the list;

(ii) a field form box for receiving a field name for each field defined in the window; and (iii) a drop down menu operable for selecting a data type associated with each field defined in the window; and (c) a third dialog box, comprising:

(i) a reference box for showing a name associated with the list; and (ii) a "FINISH" button for creating the list, such that each field in each record is logically and continuingly associated with every other field in the record, regardless of whether a user selects all of the fields within each record when manipulating records within the list.

8. The user interface of claim 7, wherein the first dialog box further comprises:

(a) a first reference window for receiving user input to identify the location of the data to import into the list external to the spreadsheet; and (b) a second reference window for receiving user input to identify the location in the spreadsheet of the list.

9. The user interface of claim 7, wherein the second dialog box further comprises a plurality of buttons operable for defining the fields in the list.

10. The user interface of claim 9, wherein the plurality of buttons is comprised from the group consisting essentially of an "Add" button, a "Modify" button, a "Delete" button, and a "Setting" button.

11. The user interface of claim 7, wherein the list comprises:

(a) a frame operable for defining a border of the list;

(b) a row selector for indicating which row of the list is selected;

(c) a plurality of field headers operable for identifying the fields in the plurality of records; and (d) a cell table operable for storing individual fields.

12. The user interface of claim 11, wherein the frame is active when an active cell is within the list.

13. The user interface of claim 11, wherein the field headers are ghosted out over the top of a spreadsheet column header when the field headers are scrolled off the spreadsheet.

14. The user interface of claim 11, wherein embedded data comprise an unused space around the cell table, the unused space expanding as new records are inserted into the cell table, the unused space being operable for facilitating the insertion of new records and fields by maintaining a region between the frame and the cell table.

* * * * *